Figure 1:
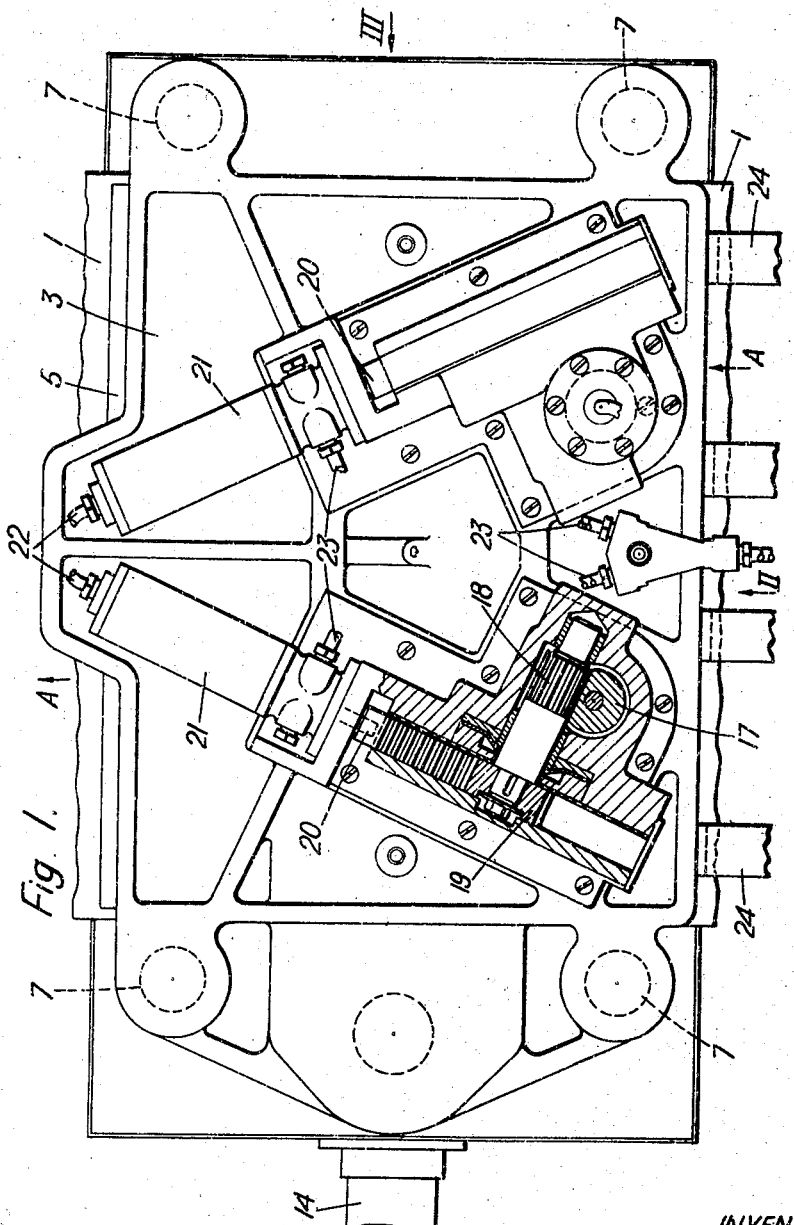

Sept. 9, 1958

R. W. E. MOSSE 2,850,856

BAG CLOSING MACHINES

Filed Dec. 31, 1956

11 Sheets-Sheet 1

INVENTOR
RICHARD W. E. MOSSE
BY
ATTORNEY

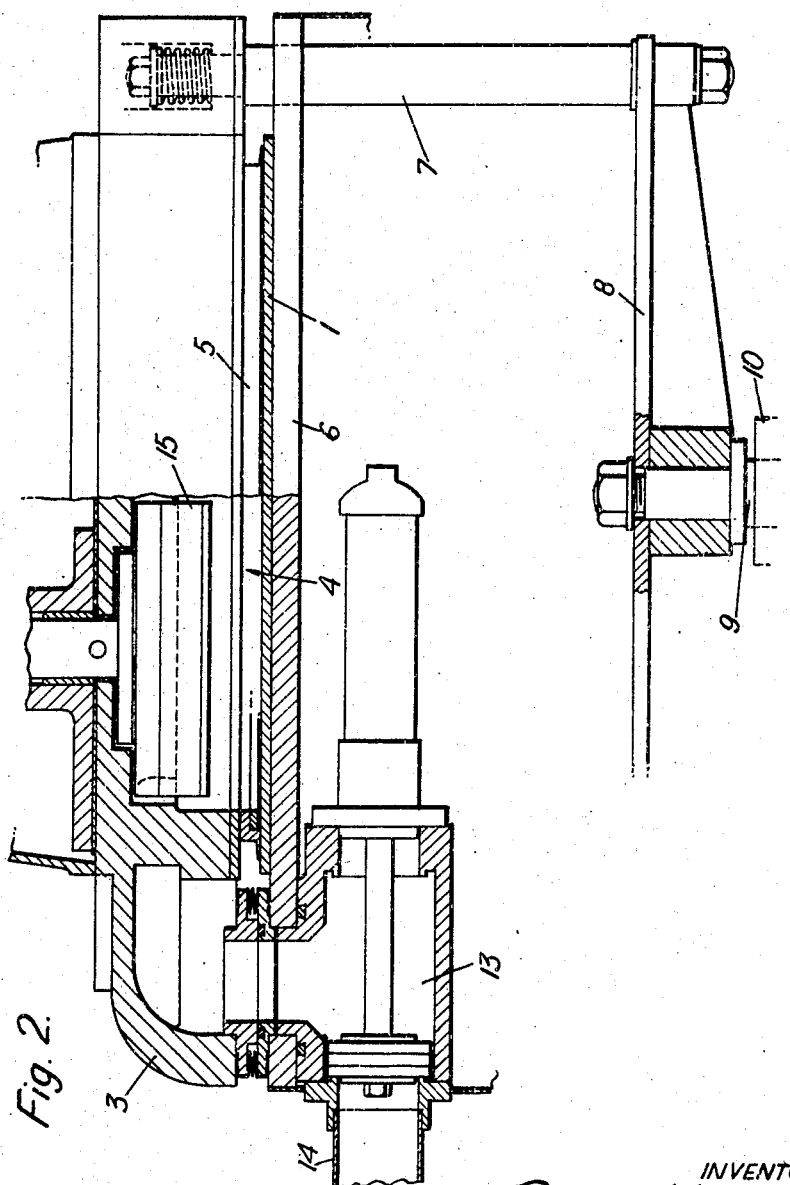

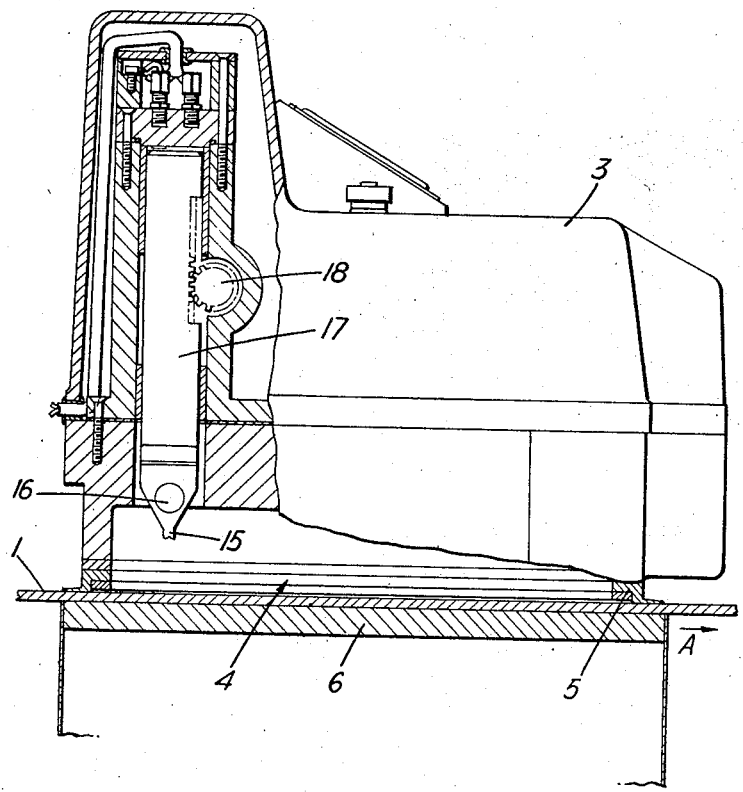

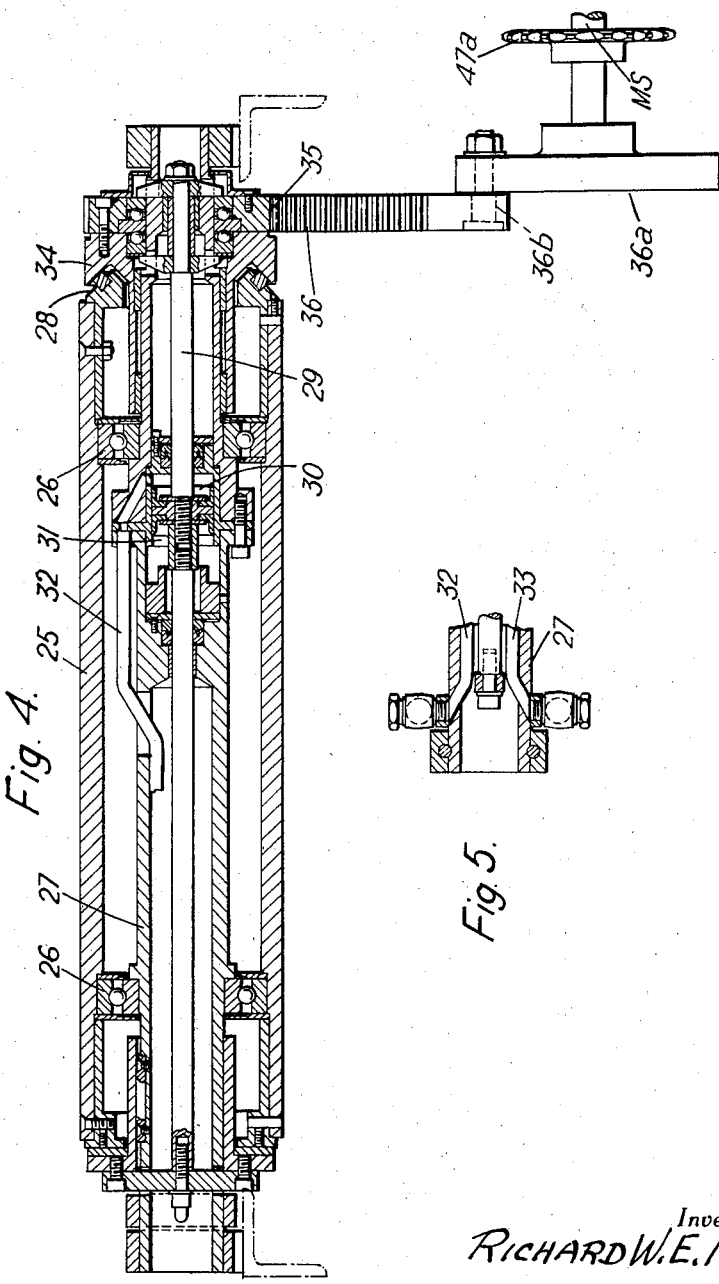

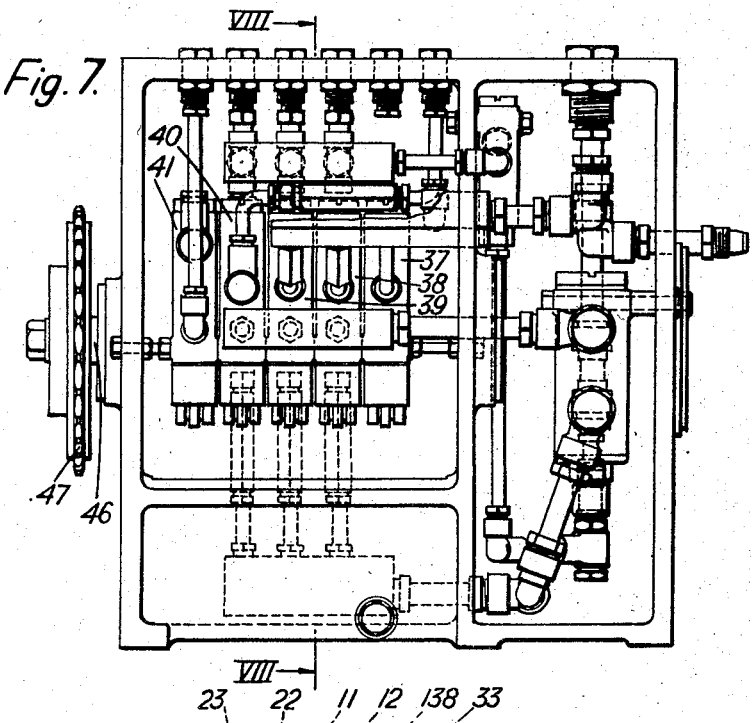
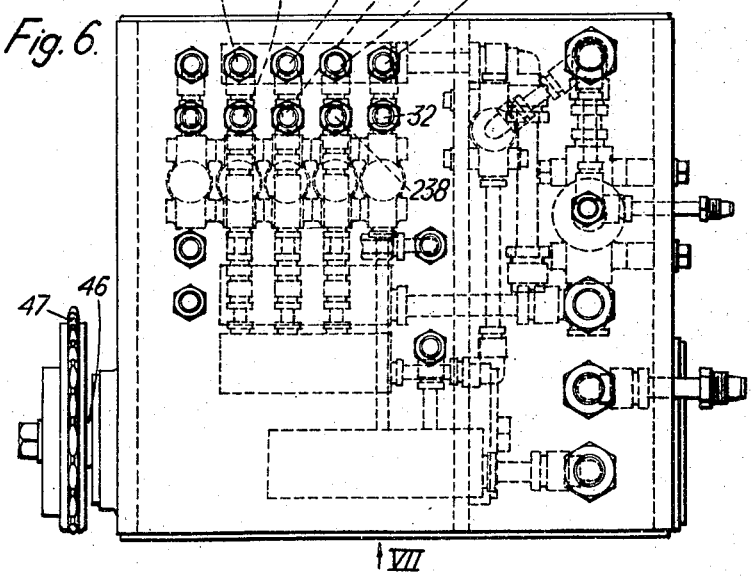

Sept. 9, 1958  R. W. E. MOSSE  2,850,856
BAG CLOSING MACHINES
Filed Dec. 31, 1956  11 Sheets-Sheet 6

Inventor
RICHARD W. E. MOSSE
By

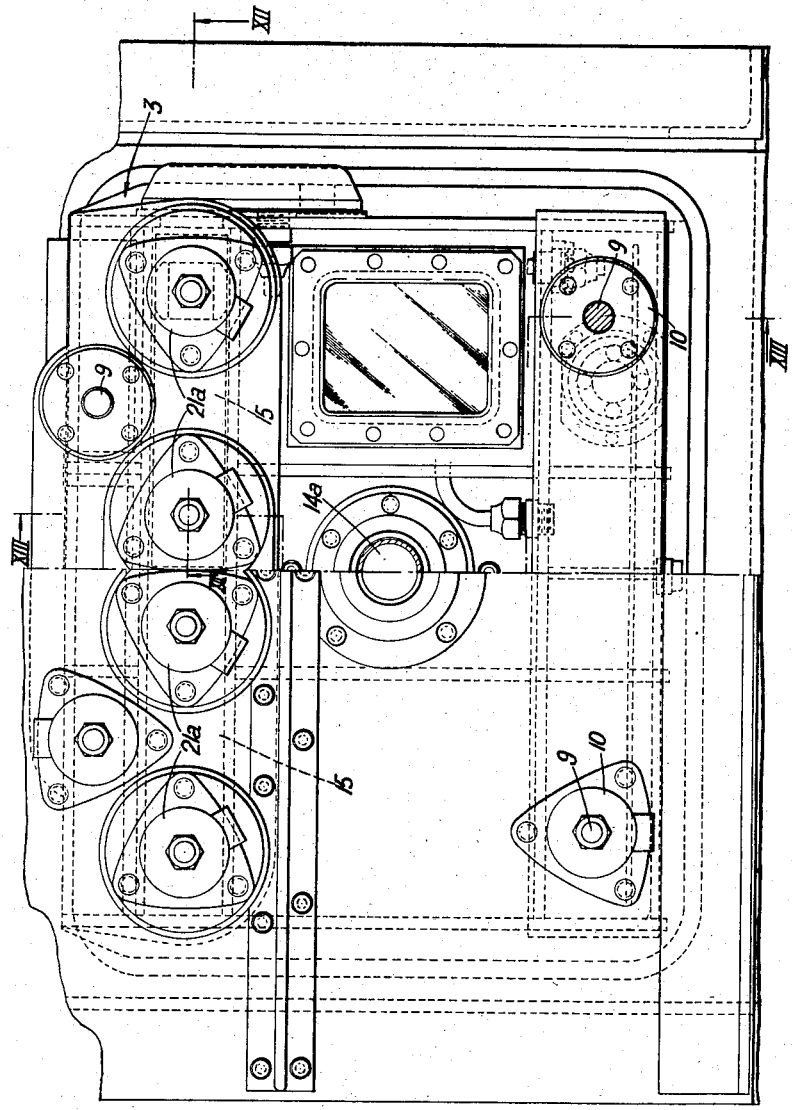

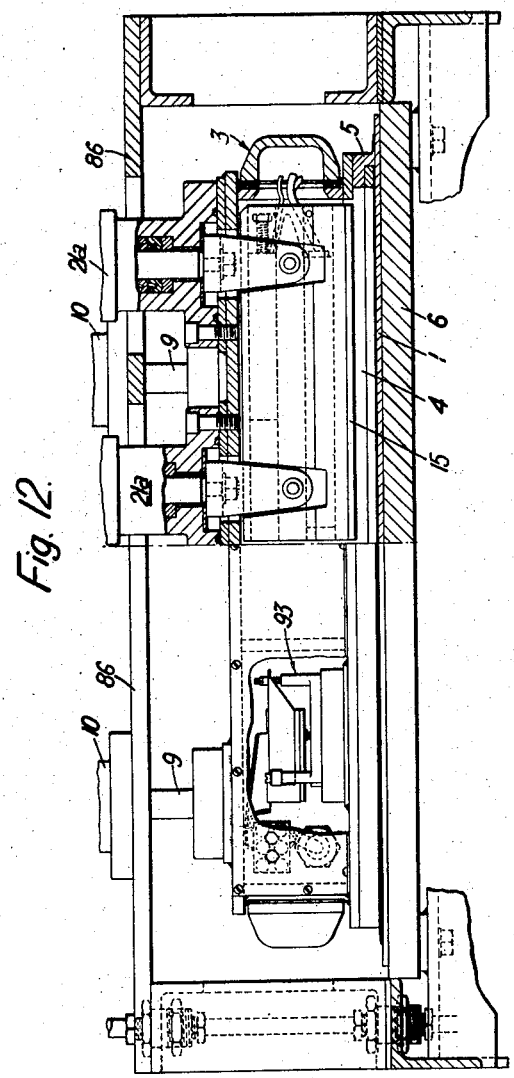

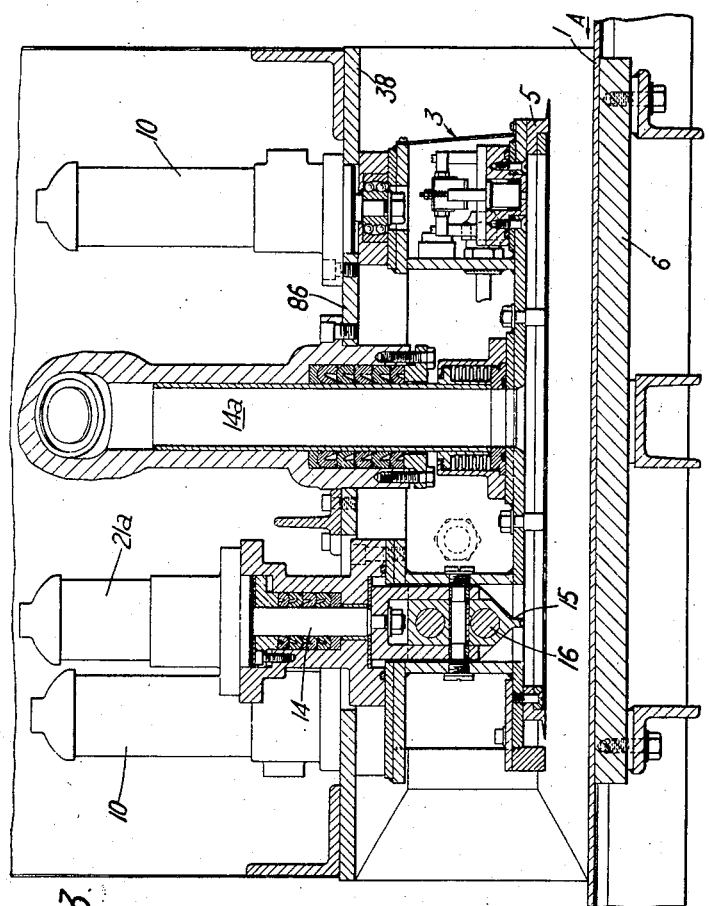

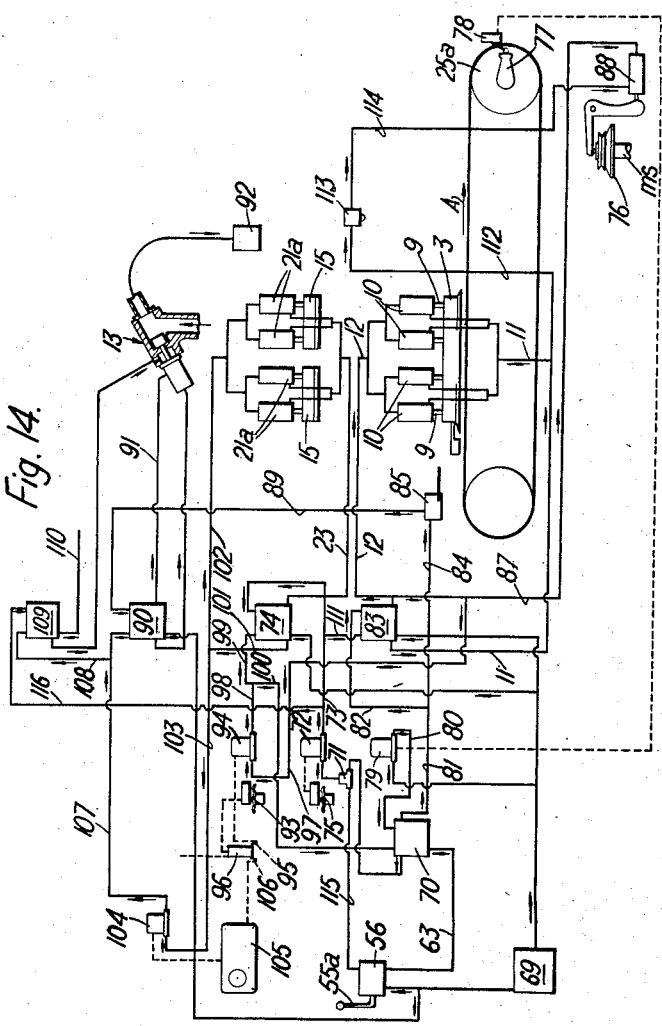

United States Patent Office 2,850,856
Patented Sept. 9, 1958

2,850,856

BAG CLOSING MACHINES

Richard Wolfgang Emil Mosse, London, England, assignor to The Metal Box Company Limited, London, England, a British company Application December 31, 1956, Serial No. 631,769

Claims priority, application Great Britain January 3, 1956

16 Claims. (Cl. 53—89)

This invention relates to bag-closing machines and in particular to a machine for closing bags which are heat-sealable at least in the region of the mouths thereof.

In self-service stores it is ofen required to pack commodities for sale in sealed transparent bags which display the commodities in an attractive manner while maintaining high hygienic conditions. When, however, the commodity is perishable, for example when it is bacon or other forms of meat, the interior of the bag can, with advantage, be vacuumised, or have the air therein replaced by an inert gas, to retain the fresh condition of the commodity for the longest possible time.

It is a main object of the present invention to provide a machine for closuring bags for containing a perishable commodity and for creating a vacuum in the bags, or for replacing air in the bags with an inert gas, during the closuring operation. It is also an object of the invention to provide a machine of this kind which is relatively cheap to produce; and a still further object is to provide a machine which will operate at a relatively high rate of output, for example a rate of the order of sixty or more sealed bags per minute.

According to the present invention there is provided apparatus for enclosing commodities in heat-sealed bags, comprising for bag material and commodities located relative thereto for enclosure thereby a transporter intermittently movable to and from a commodity enclosing position and having a heat-resistant air-impermeable surface, a housing supported for reciprocation to and from chamber-forming relation with said surface to form therewith an airtight sealing chamber, atmosphere-controlling means connected with the housing and operable in timed relation with the movements of the housing to create in the chamber a vacuum or to replace air in the chamber by an inert gas, and heating means located in the housing for movement therewith and for movement relative thereto subsequent to the operation of said atmosphere-controlling means so as to co-operate with the heat-resistant surface of the transporter and effect heat-sealing of bag material about a commodity in the chamber.

Figure 8:
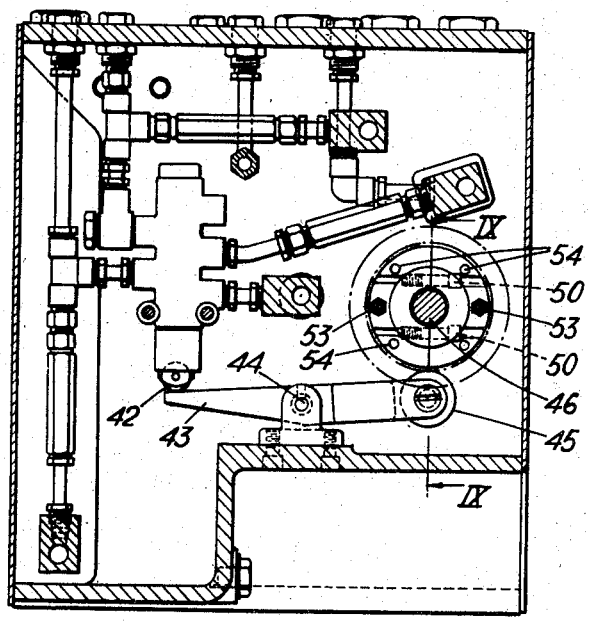
Figure 9:
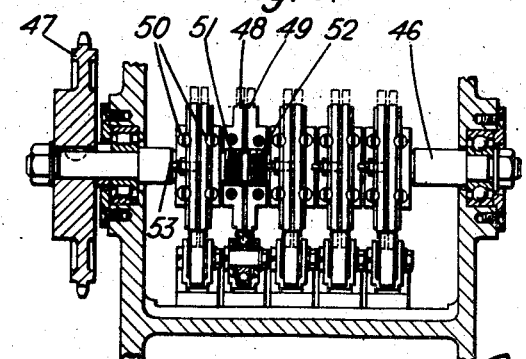
Figure 10:
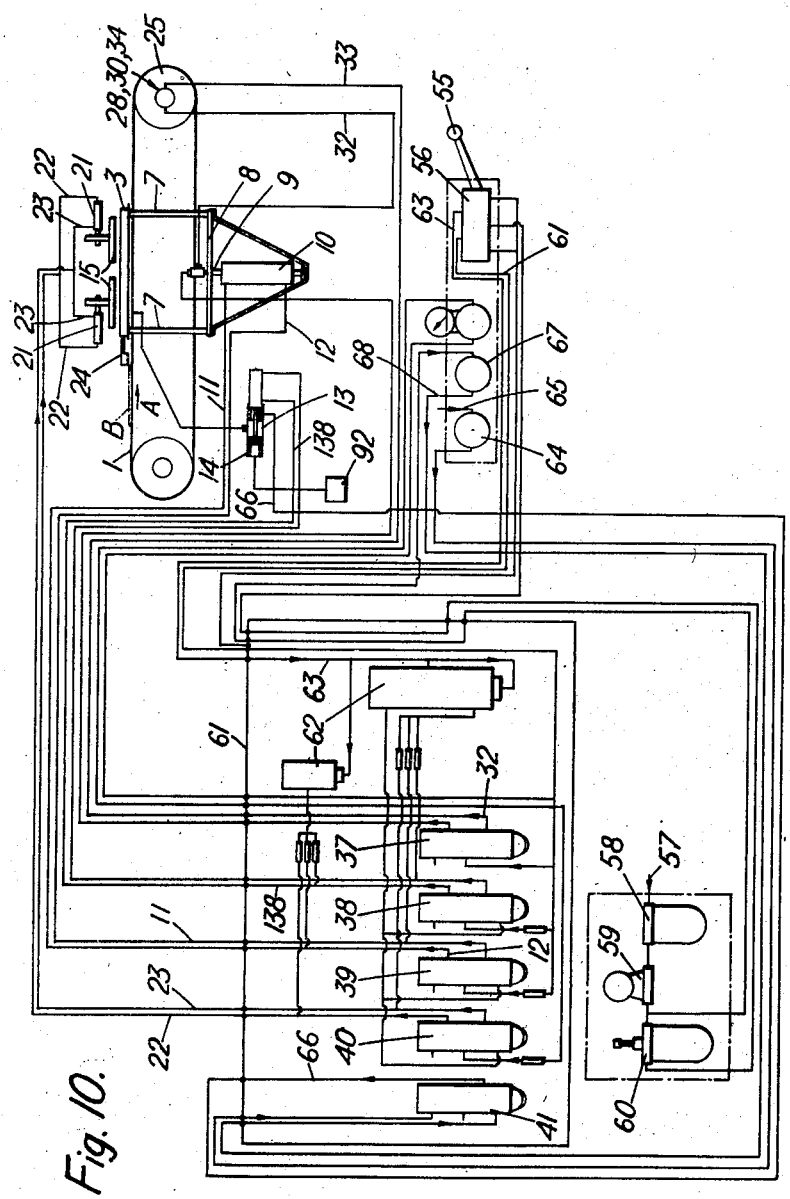

In order that the invention may be clearly understood, one embodiment thereof will now be described, by way of example, with reference to the accompanying diagrammatic drawings in which:

Fig. 1 is a top plan, partly in section, of a part of a machine according to the invention, Fig. 2 is an elevation, partly in section, looking in direction of arrow II, Fig. 1, Fig. 3 is an elevation, partly in section, looking in direction of arrow III, Fig. 1, Fig. 4 is a longitudinal section through a driving pulley for the transporter belt of the machine, Fig. 5 is a section on line V—V, Fig. 4, Fig. 6 is a top plan of a control unit embodied in the machine, Fig. 7 is an elevation looking in direction of arrow VII, Fig. 6, Fig. 8 is a section on line VIII—VIII, Fig. 7, Fig. 9 is a part section on line IX—IX, Fig. 8, Fig. 10 is a diagram illustrating the mode of operation of the machine, Fig. 11 is a top plan, partly in section, of a part of a modified form of machine according to the invention, Fig. 12 is a half section on line XII—XII, Fig. 11, Fig. 13 is a section on line XIII—XIII, Fig. 11, and Fig. 14 is a diagram illustrating the mode of operation of the modified form of machine.

Like reference numerals refer to like or similar parts throughout the drawings.

In one convenient form of a machine according to the invention a commodity, such as a quantity of bacon, is inserted into an open-mouthed bag of known construction, which bag may be transparent, in which the interior of the bag comprises a lamination or coating which is a heat-sealable plastics material, such for example as polyethylene. Alternatively the bags may consist wholly of heat-sealable material such as polyethylene. It will be understood, however, that when the bags are preformed, only the mouth of the bag is to be sealed by the machine and, in such circumstances, the heat-sealable material may be provided only in the region of the mouth of the bag at which the heat-sealing is to be effected.

Referring to Figs. 1 to 10 of the drawings, the machine comprises a transporter in the form of an endless and preferably seamless belt 1, made of heat-resistant material which is impermeable to air, such for example as silicone rubber, and the belt is supported to be movable intermittently, in one direction by predetermined distances. The intermittent movement may be transmitted to the belt in any suitable manner, but in a preferred embodiment of the invention, movement of the belt is effected by a clutch-operated pulley 25, Figs. 4 and 10, described below.

Above the upper run of the belt a housing 3 is supported for movement towards and away from the belt, the housing being open across the underside thereof and adapted, in the lower or active position thereof, to co-operate with the upper run of the belt to form therewith a sealing chamber 4, Figs. 2 and 3, in which a commodity can be enclosed in a vacuumised bag. To facilitate the formation of an airtight sealing chamber between the belt and the housing the lower edge of the housing is fitted with a one piece moulded rubber sealing lip 5. Beneath the belt in the region thereof to be engaged by the housing there is provided a rigid abutment 6 against which the belt is compressed, as illustrated in Fig. 2, on movement of the housing to form therewith the sealing chamber 4.

The housing 3 is supported by pillars 7 carried by a spider frame 8 secured to a piston-carrying rod 9 which in turn is secured to a piston, not shown, in a cylinder 10. The cylinder 10 is connected by air lines 11, 12, Fig. 10, which control movement of the housing to and from the chamber-forming positions thereof. A vacuum valve 13, Figs. 2 and 10, is connected by pipe 14, Fig. 2, to the abutment 6 and the valve 13 is operable, as described below, after the housing 3 is in the chamber-forming position thereof to apply negative air pressure to the sealing chamber 4.

The housing, as described below, remains in cooperation with the belt after the application of the negative air pressure to the sealing chamber and while heat-sealing of the mouth of the bag is effected. The heat-sealing is effected by two heater bars 15, one for each of two bags arranged side-by-side for closuring and each heater houses an electrical heater element 16, Fig. 3, and, if desired, a thermostatic control device not shown. Each heater bar is supported for movement with the housing 3 and for movement relative thereto to permit co-operation of the heater bar with the belt 1 to effect the desired heat-sealing of the bag material. As shown in Figs. 1 and 3, each heater bar is supported by a rack 17 meshing with a pinion 18 rotatable by a further pinion 19, Fig. 1, through a rack formed on a piston rod 20 the piston, not shown, for which is housed in a cylinder 21 connected with flexible pipes 22, 23 by which compressed air is admitted to the cylinder to control movement of the heater bar into and out of co-operation with the belt 1. It will be understood that as the belt 1 is made of heat-resistant material, should there be no bag in position for sealing when a heater bar is moved to the sealing position thereof, no damage will be incurred by the belt.

The width of the belt 1 is such that two bags B, Fig. 1, each containing a commodity to be sealed therein, can be placed side-by-side on the belt with the mouths thereof transverse to the direction of movement, as indicated by arrow A, Figs. 1 and 10, of the upper run of the belt. The bags, with the commodities therein, are placed on the belt, for example by an operator, with the bottoms of the bags located against a stop 24, Figs. 1 and 10. This is conveniently done while the belt is at rest and the preceding pair of bags being sealed within the chamber 4.

Intermittent movement of the belt 1 is effected by a pulley 25, Figs. 4 and 10, which is supported for rotation by ball races 26, Fig. 4, mounted on a stationary cylinder 27 co-axial with and extending lengthwise through the pulley. To one end of the pulley is secured the driven portion 28 of a friction clutch the driving portion of which is secured to a piston rod 29 for axial movement therewith. The piston rod has a piston 30 secured thereto for movement in a chamber 31 housed in the cylinder 27 and to which compressed air can be admitted through pipes 32, 33, Figs. 5 and 10, to cause making and breaking of the clutch. The driving portion 34 of the clutch is connected to the rod 29 for axial movement therewith and rotation relative thereto and is continuously rotatable by a gear wheel 35 which is secured to the clutch portion 34 and is rotated by a rack 36 reciprocated by a flywheel 36a and crank 36b from the main shaft MS which is continuously rotatable as by an electric motor, not shown. By this arrangement harmonic motion is applied to the belt.

Operation of the machine is automatically controlled by a control unit, Figs. 6 to 9, which comprises five cam-operated valves 37, 38, 39, 40, 41, Fig. 7, of which valve 37 controls the clutch, valve 38 controls the vacuum valve 13, valve 39 controls housing 3, valve 40 controls the heater bars 15, and valve 41 controls gas-flushing of the chamber 4 when desired as described below. Each of the valves is a spool-type valve with moving O rings with the roller 42, Fig. 8, carried on the end of the spool. The roller 42 is engaged by one arm of a lever 43 pivoted at 44. The other arm of lever 43 carries a cam follower 45 to co-operate with a cam on a cam shaft 46 to which is secured a sprocket or gear wheel 47 driven from a sprocket 47a, Fig. 4, on the main shaft MS of the machine.

Each cam consists of two parts 48, 49, Fig. 9, having identical profiles and each part consists of two halves retainable in operative relation by screws, dowels or the like 50. The cam shaft 46 is provided at each cam position with axially spaced left- and right-hand screw threads 51, 52, Fig. 9, and the two halves of each cam part are separated to permit them to be fitted to the threads 51, 52 after which they are connected by the screws 50. One of the two cam parts is fitted with diametrically opposite stop pins 53 which extend through a face thereof for engagement by a face of the other cam part as illustrated in Fig. 9. The two parts of the cam are screwed towards each other until their profiles are aligned and the face of one part is firmly abutting the stop pins 53 protruding through the face of the other part and the cams are rotated to bring them into the desired phased relationship thereof. Rotation of the cams is effected by a key spanner fitted into one of a plurality of apertures 54, Fig. 8, formed in the cams. By the arrangement of cams and cam shaft just described the cams can be rigidly secured to the cam shaft without the use of grub-screws or the like, as has heretofore been customary, and rotation of the cam shaft serves more firmly to lock the cams in position thereon. Further, the amount of dwell or rise can be varied by rotating one part of the cam relative to the other.

When the clutch is inactive the housing 3 is always in the raised position thereof relative to the belt 1 and in order to effect operation of the machine a control handle 55, Fig. 10, is operated. Operation of the handle 55 to the starting position thereof actuates a main supply valve 56 so that compressed air from a compressor, not shown, is applied via line 57, through a filter 58, pressure-reducing gauge 59, and lubricator 60 to a supply line 61 which serves the whole of the control unit. Thus when the cam for the valve 37 effects operation of the valve to the "on" position thereof air passes along line 32 and causes the clutch to be engaged to effect movement of the belt 1. As valve 37 operates to disengage the clutch, valve 39 becomes operative to pass air along line 12 thereby to cause housing 3 to descend and form an air-tight chamber with the now stationary belt 1, the bags carried by the belt being located in the chamber for sealing. Next, the valve 38 becomes on line 138 operatively to open the vacuum valve 13 and, through pipe 14 which is connected to a vacuum pump 92, create a vacuum in the chamber, the valve 38 remaining open until after bag sealing is effected. The application of negative air pressure to the sealing chamber 4 causes a vacuum to be created therein and also causes an even vacuum to be formed in and around the bags contained in the sealing chamber thereby avoiding any tendency for the sides of the bag to collapse relative one to the other in a manner such as might cause air to be entrapped within the bag.

After creation of the vacuum, the valve 40 is operated to pass air along line 22 thereby to cause movement of the heater bars into engagement with bags to seal the mouths thereof, and just after engagement of the bars 15 with the bags, valve 38 operates and closes valve 13 to the vacuum pump 92. At the same time valve 41 is opened to admit compressed air from valve 67, through line 68, to the chamber 4 through line 66 and valve 13. The chamber thus returns quickly to atmosphere pressure and is ready for raising. The bags are so disposed in chamber 4 that, on downward movement of the heater elements, the heater elements engage opposed portions of the bags adjacent to the mouths thereof but between the mouths and the bottoms of the bags and by the application of heat and pressure thereto, that is compression of the bag areas engaged between the heater elements and the belt, effect sealing of the bags thereby to enclose the commodities within the bags in an atmosphere conducive to the preservation of the commodities. At the end of the sealing operation valve 40 opens line 23 to cause the heater bars to be restored and valve 38 is closed. Valve 39 then operates to open line 11 so that the housing 3 is restored to the starting position thereof. This cycle of operations continues while control handle 55 remains in the "start" position thereof. To ensure that the housing 3 returns to the starting position thereof on movement of the control handle 55 to the "stop" position thereof the valves 38, 39, 40 are connected with evacuating valves 62 in the "off" line 63 from valve 56.

In some instances it may be desired to flush the chamber 4 and bags located therein with an inert gas instead of vacuumizing them. For this purpose the valve 41 is utilised and is operated by a cam on shaft 46. When valve 41 is used for gas flushing, gas is admitted to the valve under control of a valve 64, Fig. 10, from a source, not shown, to which valve 64 is connected by line 65. On operation of valve 41 by its cam gas passes to the chamber via line 66 and valve 13. If the gas is at atmospheric pressure then the chamber is ready for lifting, but should it be below atmospheric pressure then when the chamber is filled with the required amount of gas, air must be passed to the chamber to bring it to atmospheric pressure. It should be understood that for gas flushing gas must enter the chamber before the sealing bars descend.

In the modified form of the machine, illustrated in Figs. 11 to 14, the housing 3 is supported by piston-carrying rods 9, the heater bars are supported by piston-carrying rods, and operation of the atmosphere-controlling means is controlled by movements of the housing instead of by cams as described above. Operation of the modified form of machine will be described with particular reference to Fig. 14 in which air lines are shown as full lines and electrical connections are shown as dotted lines.

Referring to Fig. 14, the air circuit is supplied from a compressor 69 connected to a main supply valve 56 manually operable, by handle 55a on starting and stopping of the machine. On starting, handle 55a is operated to cause air to flow along line 63 to a relay valve 70 and thence to a shuttle valve 71 and a solenoid air pilot valve 72, that is a pilot valve which is operated under control of a solenoid, and along line 73 to a relay valve 74. The pilot valve 72 is controlled by a pressure-sensitive switch 75 which is located in the housing 3 and which is arranged to cause the pilot valve 72 to be open when the housing is at atmospheric pressure, as is the case when it is in the raised position thereof. At this time, however, the relay valve 70 is closed.

The motor, not shown, which drives the main shaft MS of the machine is started and the clutch 76 is engaged so that the belt 1 is moved to convey the bags thereon to the sealing, or commodity enclosing position, at about which time an actuator, shown as a striker 77 rotatable with the pulley 25a, around which the belt passes, operates an electric knock-off switch 78 thereby to energise the solenoid of a second solenoid air pilot valve 79.

The pilot valve 79 passes air along line 80 to actuate the relay valve 70 so that air passes therefrom along lines 81, 82 to a third relay valve 83 and along lines 81, 84 to a control switch shown as a micro pilot valve 85, that is a valve which is operated by only a very small movement of the valve operating gear. The control switch 85, not shown in Figs. 11 to 13, is mounted on a bridge 86, Figs. 12 and 13, which also supports the housing 3 and its associated operating devices, to be engaged by the housing 3 as the housing approaches the end of its downward stroke.

Operation of relay valve 83 opens the valve to lines 12, 87 connected respectively to cylinders 10 and 88 thereby to cause the housing 3 to be moved downwards to chamber-forming relation with the belt 1, and to effect stopping of the belt by disengagement of clutch 76. As the housing 3 approaches the bottom of its stroke it operates the control switch 85 thereby permitting air from line 84 to flow along line 89 to a fourth relay valve 90 and thence by line 91 to the vacuum valve 13 which controls via pipe 14a, Fig. 2, the application of negative air pressure by the vacuum pump 92 to the chamber 4.

When the pressure in the chamber 4 has fallen to 3 inches of mercury a pressure-sensitive switch 93 located in the housing is operated and causes operation of a third solenoid air pilot valve 94 through contact 95 of an electrical relay 96. It will be understood that at this time, owing to the reduced pressure in the chamber, switch 75 will have caused the pilot valve 72 to be closed thus cutting off air line 73 to relay valve 74.

Operation of pilot valve 94 causes air to flow from line 97, connected to line 87, along lines 98, 99 to the relay valve 74 and along lines 98, 100 to the relay valve 70. Air on line 99 opens valve 74 to lines 101, 102 and so applies air to cylinders 21a to effect downward movement of the heater elements 15 relative to the housing 3 and the sealing of the bags in chamber 4.

Air on line 101 also passes along line 103 to a fourth solenoid air pilot valve 104 controlled by a timing device 105 of any suitable kind which is conditioned via the contact 106 of relay 96. At the end of the period as determined by the timing device the pilot valve 104 is operated so that air passes along line 107 to relay valve 90, and along lines 107, 108 to a fifth pilot valve 109. Application of air on line 107 to valve 90 causes closing of the vacuum valve 13 to the pump 92 and valve 109 admits from line 110, as appropriate, atmospheric air or an inert gas to the chamber 4. When the machine is adapted for gas flushing the circuit of Fig. 14 is modified to permit gas to be admitted to the chamber before the sealing bars are lowered. When the pressure in the chamber is restored to atmospheric pressure the pressure-sensitive switch 75 reopens and pilot valve 72 operates relay valve 74 so that air along line 23 causes the heater elements to be raised relative to the housing 3. Air along line 111 operates relay valve 83 so that air is passed along line 11 to return the housing 3 to the raised position thereof. Line 11 is also connected to a line 112 to apply air to a start switch shown as a relay valve 113 which is mounted in the path of the rising housing 3 to be engaged thereby as the housing approaches the top of its stroke. On operation of start switch 113 by housing 3 air passes via line 114 to cylinder 88 and effects operation of clutch 76 thereby initiating a further cycle of operations as just described.

When the machine is stopped the handle 55a is restored to the starting position thereof thereby cutting off line 63 and applying the supply of air to line 115. The supply of air on line 115 is applied via lines 73 and 111 to the relay valves 74, 83 to ensure the return of the housing 3 to the raised position thereof should the machine be stopped while the housing is in the lower or chamber-forming position thereof after operation of the timer 105, air at this time being passed to relay valve 109 along line 116 which is connected to line 73.

Further, if desired, heat-sealing may be effected by a pulse-heater receiving electrical pulses to effect intermittent heating of the bar and permitting cooling thereof immediately following the formation of each heat-seal.

I claim:

1. Apparatus for enclosing commodities in heat-sealed bags, comprising an endless heat-resistant air-impermeable belt the upper run of which is adapted to receive filled bags for sealing, a driving pulley for the belt, a clutch adapted to couple said pulley to continuously rotatable driving means, a housing supported for reciprocation to and from chamber-forming relation with the upper run of the belt to form therewith an airtight sealing chamber, atmosphere-controlling means connected with the housing to vary the atmosphere in the chamber, heating means located in the housing for movement therewith and for movement relative thereto subsequent to the operation of said atmosphere-controlling means to co-operate with the heat-resistant surface of the transporter and effect heat-sealing of a bag in the chamber, and operating means common to the housing and the clutch and operable to declutch the pulley from said driving means during movement of the housing to chamber-forming relation with the belt and to re-clutch the pulley to the driving means during movement of the housing away from chamber-forming relation with the belt.

2. Apparatus for enclosing commodities in heat-sealed bags, comprising an endless heat-resistant, air-impermeable belt, driving means adapted to move the belt intermittently to and from a bag closing position, said driving means including a driving pulley for the belt, a friction clutch the driven portion of which is connected to the pulley for rotation therewith, a stationary cylinder co-axial with and extending through the pulley and adapted for connection with a source of fluid pressure, said cylinder supporting the pulley for rotation and housing a piston movable axially under control of fluid pressure in the cylinder and connected to the driving portion of said clutch to effect engagement and disengagement thereof with the driven clutch portion, a housing supported for reciprocation to and from chamber-forming relation with the upper run of the belt to form therewith an airtight sealing chamber, atmosphere-controlling means connected with the housing to vary the atmosphere in the chamber, and heating means located in the housing for movement therewith and for movement relative thereto subsequent to the operation of the atmosphere-controlling means to co-operate with the heat-resistant surface of the transporter and effect heat-sealing of bag material about a commodity in the chamber.

3. Apparatus for enclosing commodities in heat-sealed bags, comprising an endless heat-resistant air-impermeable belt, driving means adapted to move the belt intermittently to and from a bag sealing position, said driving means including a driving pulley for the belt, a friction clutch the driven portion of which is connected to the pulley for rotation therewith, a stationary cylinder co-axial with and extending through the pulley and adapted for connection with a source of fluid pressure, said cylinder supporting the pulley for rotation and housing a piston movable axially under control of fluid pressure in the cylinder and connected to the driving portion of said clutch to effect engagement and disengagement thereof with the driven clutch portion, a housing supported for reciprocation to and from chamber-forming relation with the upper run of the belt to form therewith an airtight sealing chamber, atmosphere-controlling means connected with the housing to vary the atmosphere in the chamber, heating means located in the housing for movement therewith and for movement relative thereto subsequent to the operation of the atmosphere-controlling means to co-operate with the heat-resistant surface of the transporter and effect heat-sealing of bag material about a commodity in the chamber, fluid-actuated valves connected with the atmosphere-controlling means and heater means to control operation thereof, a continuously rotatable main shaft, a cam shaft rotated by said main shaft, and cams carried by said cam-shaft to effect operation of the fluid-actuated valves.

4. Apparatus for enclosing commodities in heat-sealed bags, comprising a silicone rubber belt movable intermittently to and from a bag closing position and having a width sufficient to permit at least two open-mouthed bags to be laid side-by-side thereon for simultaneous sealing, a driving pulley for the belt, a clutch adapted to couple said pulley to continuously rotatable driving means, a housing supported for reciprocation to and from chamber-forming relation with the upper run of the belt to form therewith an airtight sealing chamber, atmosphere-controlling means connected with the housing to vary the atmosphere in the chamber, heating means located in the housing for movement therewith and for movement relative thereto subsequent to the operation of the atmosphere-controlling means to co-operate with the belt and effect heat-sealing of the mouths of bags in the chamber, and operating means common to the housing and the clutch and operable to declutch the pulley from said driving means during movement of the housing to chamber-forming relation with the belt and to re-clutch the pulley to the driving means during movement of the housing away from chamber-forming relation with the belt.

5. Apparatus for enclosing commodities in heat-sealed bags, comprising a silicone rubber belt movable intermittently to and from a bag closing position and having a width sufficient to permit at least two open-mouthed bags to be laid side-by-side thereon for simultaneous sealing, driving means adapted to effect said intermittent movement and including a driving pulley for the belt, a friction clutch the driven portion of which is connected to the pulley for rotation therewith, a stationary cylinder co-axial with and extending through the pulley and adapted for connection with a source of fluid pressure co-axial with and extending through the pulley, said cylinder supporting the pulley for rotation and housing a piston movable axially under control of fluid pressure in the cylinder and connected to the driving portion of said clutch to effect engagement and disengagement thereof with the driven clutch portion, a housing supported for reciprocation to and from chamber-forming relation with the upper run of the belt to form therewith an airtight sealing chamber, atmosphere-controlling means connected with the housing to vary the atmosphere in the chamber, heating means located in the housing for movement therewith and for movement relative thereto subsequent to the operation of the atmosphere-controlling means to co-operate with the belt and effect heat-sealing of the mouths of bags in the chamber, fluid-actuated valves connected with the atmosphere-controlling means and heater means to control operation thereof, a continuously rotatable main shaft, a cam shaft rotated by said main shaft, and cams carried by said cam-shaft to effect operation of the fluid-actuated valve.

6. Apparatus for enclosing commodities in heat-sealed bags, comprising a silicone rubber belt, driving means adapted to move the belt intermittently to and from a bag sealing position, said driving means including a driving pulley for the belt, a friction clutch the driven portion of which is connected to the pulley for rotation therewith, a stationary cylinder co-axial with and extending through the pulley and adapted for connection with a source of fluid pressure, said cylinder supporting the pulley for rotation and housing a piston movable axially under control of fluid pressure in the cylinder and connected to the driving portion of said clutch to effect engagement and disengagement thereof with the driven clutch portion, a housing supported for reciprocation to and from chamber-forming relation with the upper run of the belt to form therewith an airtight sealing chamber, atmosphere-controlling means connected with the housing to vary the atmosphere in the chamber, and heating means located in the housing for movement therewith and for movement relative thereto subsequent to the operation of the atmosphere-controlling means to co-operate with the belt and effect heat-sealing of the mouths of bags in the chamber.

7. Apparatus for enclosing commodities in heat-sealed bags, comprising an endless heat-resistant air-impermeable belt, driving means adapted to move the belt intermittently to and from a bag sealing position, said driving means including a clutch, a housing supported for reciprocation to and from chamber-forming relation with the upper run of the belt to form therewith an airtight sealing chamber, a knock-off switch connected with said clutch and adapted to terminate operation of the clutch, an actuator movable in timed relation with the belt and connected with said knock-off switch to effect operation thereof, a starting switch connected with the clutch to effect restarting thereof, said starting switch being operable by the housing on movement thereof to the position at which it is most remote from the belt, atmosphere-controlling means operable by movement of the housing to and from chamber-forming relation with the belt to vary the atmosphere in the chamber, and heating means located in the housing for movement therewith and for movement relative thereto subsequent to the operation of the atmosphere-controlling means to co-operate with the heat-resistant surface of the belt and effect heat-sealing of a bag in the chamber.

8. Apparatus according to claim 7, wherein movement of the heating means relative to the housing is controlled by pressure-sensitive switches contained in said housing, one said switch being operative as the result of operation of the atmosphere-controlling means to cause co-operation between the heating means and the transporter and a second switch being operative as the result of the chamber being restored to normal atmospheric pressure thereby to return the heating means to the inactive condition thereof relative to the housing.

9. Apparatus according to claim 8, wherein said first-mentioned pressure-sensitive switch is connected with a pilot valve through an electric relay to control movement of the heating means into operative relation thereof with the belt, and said electric relay is connected with a timing device adapted to terminate operation of the atmosphere-controlling means.

10. Apparatus according to claim 9, wherein operation of the atmosphere-controlling means is initiated by a control switch operable by the housing on movement thereof into chamber-forming relation with the belt.

11. Apparatus according to claim 7, wherein operation of the clutch, the housing, and the heating means is effected by compressed air through the medium of pistons housed in cylinders under control of interconnected air relay valves and pilot valves operation of which is controlled by said pressure-sensitive switches and knock-off switch.

12. Apparatus for enclosing commodities in heat-sealed bags, comprising a silicone rubber belt movable intermittently to and from a bag closing position and having a width sufficient to permit at least two open-mouthed bags to be laid side-by-side thereon for simultaneous sealing, driving means for said belt including a clutch, a housing supported for reciprocation to and from chamber-forming relation with the upper run of the belt to form therewith an airtight sealing chamber, a knock-off switch connected with said clutch and adapted to terminate operation of the clutch, an actuator movable in timed relation with the belt and connected with said knock-off switch to effect operation thereof, a starting switch connected with the clutch to effect restarting thereof, said starting switch being operable by the housing on movement thereof to the position at which it is most remote from the belt, atmosphere-controlling means operable by movement of the housing to and from chamber-forming relation with the belt to vary the atmosphere in the chamber, and heating means located in the housing for movement therewith and for movement relative thereto subsequent to the operation of the atmosphere-controlling means to co-operate with the belt and effect heat-sealing of bags in the chamber.

13. Apparatus according to claim 12, wherein movement of the heating means relative to the housing is controlled by pressure-sensitive switches contained in said housing, one said switch being operative as the result of operation of the atmosphere-controlling means to cause co-operation between the heating means and the transporter and a second switch being operative as the result of the chamber being restored to normal atmospheric pressure thereby to return the heating means to the inactive condition thereof relative to the housing.

14. Apparatus according to claim 13, wherein operation of the clutch, the housing, and the heating means is effected by compressed air through the medium of pistons housed in cylinders under control of interconnected air relay valves and pilot valves operation of which is controlled by said pressure-sensitive switches and knock-off switch.

15. Apparatus according to claim 14, wherein said first-mentioned pressure sensitive switch is connected with a pilot valve through an electric relay to control movement of the heating means into operative relation thereof with the belt, and said electric relay is connected with a timing device adapted to terminate operation of the atmosphere-controlling means.

16. Apparatus according to claim 15, wherein operation of the atmosphere-controlling means is initiated by a control switch operable by the housing on movement thereof into chamber-forming relation with the belt.

References Cited in the file of this patent

UNITED STATES PATENTS

| | | |
|---|---|---|
| 781,087 | Norton et al. | Jan. 31, 1905 |
| 2,753,671 | De Puy et al. | July 10, 1956 |
| 2,778,177 | Mahaffy et al. | Jan. 22, 1957 |